B. D. NEGROTTO.
GENERATOR DRIVE MECHANISM FOR CAR TRUCKS.
APPLICATION FILED DEC. 29, 1921.
1,410,949.
Patented Mar. 28, 1922.
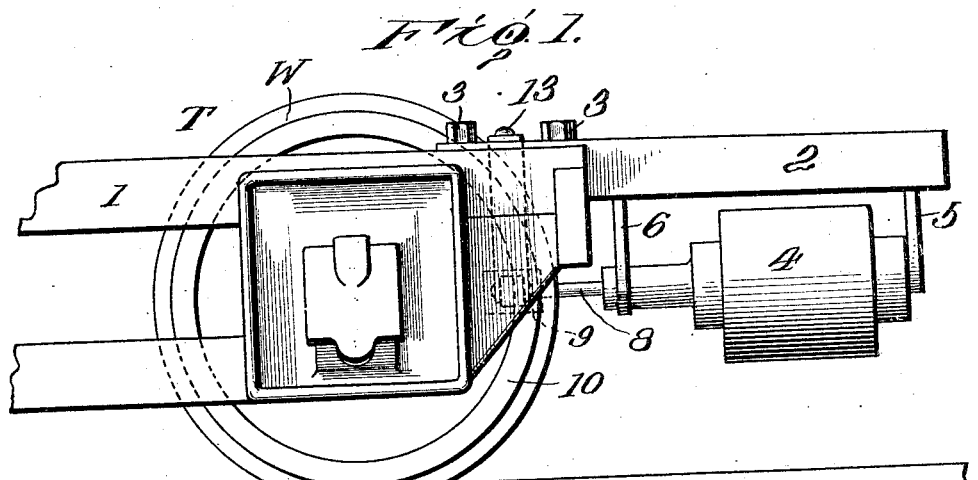
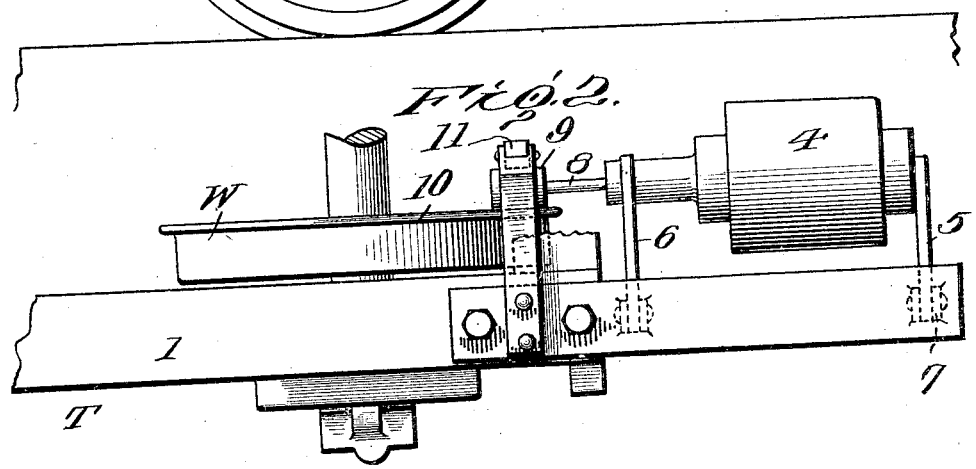
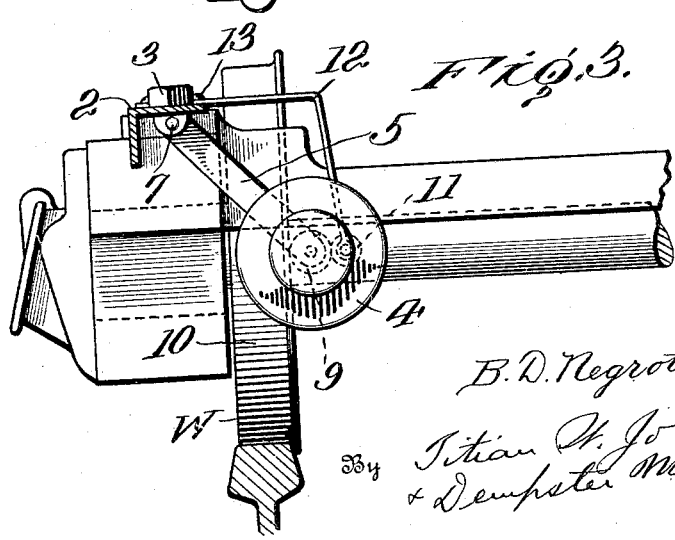

UNITED STATES PATENT OFFICE.

BUCHANAN D. NEGROTTO, OF NEW ORLEANS, LOUISIANA.

GENERATOR DRIVE MECHANISM FOR CAR TRUCKS.

1,410,949.

Specification of Letters Patent. Patented Mar. 28, 1922.

Application filed December 29, 1921. Serial No. 525,664.

*To all whom it may concern:*

Be it known that BUCHANAN D. NEGROTTO, a citizen of the United States, residing at New Orleans, in the parish of Orleans and State of Louisiana, has invented certain new and useful Improvements in Generator Drive Mechanism for Car Trucks, of which the following is a specification.

The invention relates to the construction and arrangement of drive mechanism for electric generators for railway car trucks.

A principal object of the invention is to simplify and improve the drive mechanism; to eliminate belt drive mechanism and other complicating features usually accompanying belt drive mechanisms; and to make the generator more easily accessible. Other advantages consist in details of construction and arrangement as sufficiently explained hereinafter.

The accompanying drawing shows one exemplifying embodiment of the invention. After considering this in connection with the specification, persons skilled in the art will understand how variations may be made within the principles of the invention, and I do not limit myself to details except as claimed.

Fig. 1 is a side elevation of part of a car truck showing the generator and drive mechanism installed;

Fig. 2 is a top plan; and

Fig. 3 is an end elevation.

Reference letter T designates in general a car truck, of which one wheel W is shown. One of the upper side frame members 1 has an extension 2, which may be an angle bar, bolted to frame member 1 at 3. Casing 4 containing the generator is swung from frame member 2 by arms or links 5, 6. The links are pivoted at their upper ends to frame member 2 at 7, and at their lower ends may be rigidly connected to parts of the generator casing to insure a parallel movement of the links. The armature shaft 8 extends from the casing, and is provided with a friction wheel or pulley 9 arranged to bear against an annular friction surface carried by the wheel W. This surface may be the smooth annulus 10 of the car wheel adjacent to the wheel flange.

A preferred arrangement of the links and the generator is such that, as shown, the links lie at a considerable angle to the vertical; thus by gravity the generator tends to swing outward and to bring the friction wheel 9 into driving engagement with the friction surface 10 of the car wheel. To assist in the frictional engagement, additional means may be provided, such as a pulley or roll 11 bearing against the side of friction wheel 9 away from the car wheel. This pressure roll 11 is carried in bearings at the end of an arm 12 of spring metal suitably shaped and bolted at 13 to truck side member 1. The spring effect of arm 12 acting through roll 11 aids in maintaining the proper frictional engagement of the friction wheel with the car wheel to insure proper driving of the generator.

Suitable regulating devices to control the generator speed, or the generator output at different speeds, may be provided. These do not form a part of this invention, and therefore are not shown.

The drive mechanism, as will be understood from the foregoing, is very simple; it eliminates the belt of belt-drive arrangements, and the elaborate tension mechanism provided for such belt drives; and it brings the generator out, away from the truck so that it is readily accessible for inspection and repair.

I claim:

1. The combination with a car truck and wheel, of an electric generator arranged with its shaft substantially parallel to the longitudinal axis of the truck; a friction pulley carried by the armature shaft and arranged to bear against an annular smooth friction surface of the car wheel, and means for urging the friction wheel with driving force against the friction surface.

2. The combination with a car truck and wheel, of a longitudinal extension member secured to the truck, a generator casing, links pivotally connected to the extension and supporting the generator casing with the armature shaft of the generator substantially parallel to the longitudinal axis of the truck a friction pulley carried by the armature shaft and engaging a smooth vertical annular surface of the car wheel, and means for holding the friction wheel in frictional engagement with the car wheel surface.

3. The combination with a car truck and wheel, of a longitudinal extension member secured to the truck, a generator casing, links pivotally connected to the extension and supporting the generator casing with the armature shaft of the generator substantially parallel to the longitudinal axis of the truck, a friction pulley carried by the armature shaft and engaging a smooth vertical annular surface of the car wheel, the links being arranged at an angle to the vertical to cause the generator to swing by gravity so as to hold the friction wheel into driving engagement with the car wheel surface.

4. The combination with a car truck and wheel, of a longitudinal extension member secured to the truck, a generator casing, links pivotally connected to the extension and supporting the generator casing with the armature shaft of the generator substantially parallel to the longitudinal axis of the truck, a friction pulley carried by the armature shaft and engaging a smooth vertical annular surface of the car wheel, and spring means for urging the friction wheel into driving engagement with the car wheel surface.

5. The combination with a car truck and wheel, of a longitudinal extension member secured to the truck, a generator casing, links pivotally connected to the extension and supporting the generator casing with the armature shaft of the generator substantially parallel to the longitudinal axis of the truck, a friction pulley carried by the armature shaft and engaging a smooth vertical annular surface of the car wheel, the links being arranged at an angle to the vertical to cause the generator to swing by gravity so as to hold the friction wheel in driving engagement with the car wheel surface, and additional spring means for urging the friction wheel into driving engagement.

In testimony whereof I affix my signature in presence of two witnesses.

BUCHANAN D. NEGROTTO.

Witnesses:
A. C. ERNST,
GEO. V. KRONENBERGER.